United States Patent Office 2,811,453
Patented Oct. 29, 1957

2,811,453

COATED SAUSAGE AND METHOD OF PREPARING SAME

Wesley H. Childs, Chicago, Ill., assignor to Armour and Company, Chicago, Ill., a corporation of Illinois No Drawing. Application February 8, 1954,
Serial No. 408,980

8 Claims. (Cl. 99—169)

This invention relates to sausage products, and more particularly to a coated sausage and to methods for preparing such products.

Sausage has a tendency to deteriorate upon prolonged exposure to moisture, air, microorganisms, etc. This deterioration may be manifested in several ways, but particularly in the formation of a white, snow-like crust on the surface of the sausage, which has been termed "salt rust." The "salt rust" is believed to include salt and fat and gives to the sausage an extremely unpalatable appearance. The natural or synthetic casing materials which are employed in most sausage products do not prevent the formation of this crust. A number of techniques have been tried in an effort to circumvent this difficulty, such as sealing the sausage in cellophane bags, applying various coating formulations to the sausage, etc. None of these methods has eliminated the formation of "salt rust" or measurably alleviated the unsatisfactory appearance of the sausage product.

I have discovered a sausage product which is not susceptible to the above-outlined objections. It is composed of a sausage with a special coating which may comprise an aqueous system comprising a substance capable of being transformed from the sol or fluid state to the gel or viscous state, a water-insoluble cellulose material, and an organic solvent for such cellulose material. The resultant product is substantially resistant to "salt rust" while having a glistening, transparent appearance. The coat is substantially impervious to moisture, air, etc. while being sufficiently pliable so that it does not crack or shed. It has a further advantage in that it is non-tacky and substantially abrasion-resistant, making it possible to store or pack the products contiguously, thus eliminating the necessity of partitioning and insulating materials. Furthermore, the coating furnishes a continuous film over and around the sausage which is sufficiently adherent to such sausage so that no undesirable air-pockets are formed. However, the coating is such that it may be readily separated from the sausage prior to consumption.

The invention, as described, is equally applicable to sausage meat and to sausage meat which has been enclosed in a natural or synthetic casing material. It will be apparent that practice of the invention is not restricted by the size or shape of the sausage and, in addition, irregularities in the contour of the sausage can be substantially filled in and smoothed over by the special coating.

In the preferred practice the special coating is applied to the sausage in two layers. The first layer serves as the filler for the crevices and irregular contours of the sausage and as a base for the second layer. This layer may comprise an aqueous solution of the gelatinous substance, i. e. the substance which is capable of gelation. The second layer may comprise the water-insoluble cellulose material and the organic solvent for such cellulose material. The layers are not in and of themselves completely resistant to atmospheric conditions, and this surprising result is achieved through the use of a combination of layers or the ingredients therein contained. Various other ingredients may be added to the coating in order to improve or modify the nutritive value or flavor.

As an illustration of the preferred practice, the first layer, which is referred to as the primary or adherent layer, comprises an aqueous solution of a substance selected from the group consisting of pectin, gelatin, and algin. Solubilization of the substance may be facilitated by heating. The sausage is covered with this solution using any suitable method, for example, brushing, spraying, or dipping. The solution can be held at an elevated temperature during the coating operation, suitably in the range of 100 to 150° F. However, a temperature in the order of 130 to 135° F. is to be preferred. After applying the solution to the sausage so as to form a film thereon, the sausage is cooled in order to cause the film to "gelatinize" or pass into the viscous state. The film-covered sausage may be cooled to a temperature of from 50 to 90° F. to gelatinize such film thereon, and especially desirable results are achieved when this film is gelatinized by cooling the sausage to a temperature of approximately 70° F. The film can be dried, if desired, by using any suitable method which will effect the removal of water. For example, the water may be evaporated by storing the sausage under normal atmospheric conditions for a sufficient period of time.

The second layer comprises a mixture of either an alkyl cellulose such as ethyl cellulose, an acyl cellulose such as cellulose acetate, or other suitable water-insoluble cellulose material and the organic solvent for such cellulose material. By water-insoluble cellulose material is meant a cellulose ether in which the alkoxy content is such as to provide a cellulose material substantially insoluble in water but soluble in common organic solvents. The free hydroxy groups of the cellulose molecule may be substituted with alkyl radicals in increasing concentration to produce a cellulose ether which is successively soluble in water, common organic solvents and hydrocarbons. For example, ethyl celluloses having an ethoxy content of from about 19 to 35% have been found to be soluble in water, while ethyl cellulose with an ethoxy content of between about 44 and 49.5% are substantially insoluble in water but soluble in common organic solvents. Further, ethyl celluloses having an ethoxy content of from about 50 to 52.5 are soluble in hydrocarbons but substantially insoluble in most oxygenated organic solvents and water (Ott et al., Cellulose and Cellulose Derivatives, 2nd ed., p. 914).

This mixture is applied to the sausage, previously covered with the primary layer, by any suitable coating method such as described above. The mixture can be prepared and applied under substantially normal atmospheric conditions so as not to disturb the gel state of the primary layer. The product may be dried using suitable solvent removal techniques, such as flash-heating, evaporation, reduced pressure, etc. For example, if evaporation is to be used, the product will be stored under substantially normal atmospheric conditions for a period of time sufficient to cause the coating to "set" or partially solidify. The product need not be dried completely provided that a relatively non-toxic solvent is employed, i. e. a solvent which is not harmful to a human being when administered in relatively small amounts. However, if a solvent is used which is toxic in any amount, it must be completely eliminated. It is to be preferred that solvents having a relatively low-boiling point be employed in order to carry out the solvent removal step with facility under substantially normal atmospheric conditions. Examples of such preferred solvents are ethyl alcohol, acetone, ethyl acetate, and ether. If an evaporation technique is utilized to remove the solvent, the product can be stored in a drying area at a temperature in the order of 70° F. until substantially all of the solvent has been volatilized. The time period will necessarily vary depending upon the concentration and the boiling point of the solvent used.

The gelatin, pectin, or algin used in the coating may or may not be of an edible grade. However, an edible form is usually desirable in that a sausage product offered as an article of food, is subject to strict regulation for the reason that even though the coating may be stripped from the product prior to consumption, there is always a possibility that someone will eat the coating substance and be harmed thereby. The concentration of the gelatin, pectin, or algin in the water may be varied widely and is governed by the necessity of producing an adherent film over the sausage on contact with such sausage. However, a concentration from 10 to 30% with respect to such water has been found to be satisfactory, and an excellent immersant solution is obtained with approximately 20% gelatin.

Similarly, the concentration of cellulose material in the organic solvent may be varied widely. A concentration of 5 to 50% of the cellulose material with respect to the solvent has been found to be suitable, and especially desirable results are obtained when about 15% ethyl cellulose is employed.

It is unexpected that the primary layer is substantially unaffected by the organic solvent. When substances such as pectin, algin, gelatin and the like are used to form the primary layer, an organic solvent such as ethyl acetate with a highly characteristic odor will not permeate the sausage. Taste tests of the sausage product have disclosed the complete absence of characteristic odor or taste in the sausage, when, for example, ethyl acetate is employed as a solvent for the cellulose material. It should also be understood that sterilization of the sausage prior to coating will not detract from the practicability of the above process or product.

The following is a specific example of the practice of my invention using a short summer sausage enclosed by a natural casing material. The primary layer contained the following formulation:

| | Percent |
|---|---|
| Water | 65.4 |
| Gelatin | 21.8 |
| Glycerin | 6.4 |
| Corn syrup | 5.0 |
| Gum arabic | 0.4 |
| Vinegar | 1.0 |

These ingredients were combined with the water at a temperature of approximately 135° F. in order to form a clear solution. The solution was retained at substantially the same temperature while a length of sausage was momentarily immersed therein. After withdrawal, the sausage was held at about 70° F. for about 20 minutes or until the film which was formed thereon had "set."

A solution of 13% ethyl cellulose in 87% ethyl acetate was prepared at room temperature (about 70° F). The sausage with the "set" gelatin film was then momentarily immersed in the cellulose solution. After withdrawal, the sausage was stored at room temperature, about 70° F., for approximately 40 hours. The coating had been transformed into a transparent, plastic-like finish for the sausage. In shelf-life tests over a prolonged period of time, the sausage product developed none of the characteristics of "salt rust" and remained in substantially the same state. The product did not crack or shed, and the coating remained firmly affixed to the sausage.

Instead of gelatin, used in the above example, pectin or algin can be incorporated into the coating.

Instead of ethyl acetate, used in the above example, acetone, ethyl alcohol, or ether can be used as a solvent for the cellulose material.

Instead of ethyl cellulose, used in the above example, other suitable water-insoluble alkyl celluloses can be incorporated into the coating.

A coating having a superimposed layer of the following formulation provides excellent results:

| | Percent |
|---|---|
| Ethyl cellulose | 11.0 |
| Ethyl acetate | 73.7 |
| Ethyl lactate | 12.7 |
| Ester gum | 2.6 |

While in the foregoing specifications, the method and product have been described in detail and specific embodiments thereof have been set forth for the purpose of illustration, it will be apparent to those skilled in the art that this invention is susceptible to other embodiments and that many of the details set forth herein can be varied widely without departing from the basic concepts of the invention.

I claim:

1. In a method for preparing a coated sausage, the steps of covering said sausage with a base layer comprising a warm aqueous solution of a substance selected from the group consisting of gelatin, pectin, and algin, cooling said base layer to form a gelatinous film over said sausage, and superimposing on said base layer a water-insoluble alkyl cellulose material and an organic solvent for said cellulose selected from the group consisting of ethyl alcohol, acetone, ether, and ethyl acetate, and drying said layer to provide a substantially salt rust resistant coating for said sausage.

2. In a method for preparing a coated sausage, the steps of forming an aqueous solution comprising 10 to 30% of a substance selected from the group consisting of pectin, gelatin, and algin, applying at least a portion of said solution to a sausage at a temperature in the range of 100 to 150° F., cooling said solution to a temperature in the range of 50 to 90° F. to form a gelatinous film over said sausage, forming a mixture comprising 5 to 50% of a water-insoluble cellulose material in an organic solvent selected from the group consisting of ethyl alcohol, ether, ethyl acetate, and acetone, applying at least a portion of said mixture to said sausage having a gelatinous film, and drying said mixture to provide a coating for said sausage.

3. In a method for preparing a summer sausage product, the steps of forming an aqueous solution consisting of 65.4% water, 21.8% gelatin, 6.4% glycerin, 5% corn syrup, 0.4% gum arabic, and 1% vinegar by heating said solution at an elevated temperature, immersing a summer sausage enclosed in a casing in said solution heated to a temperature in the order of 130 to 135° F. to form a film of said solution on said sausage, withdrawing said sausage, reducing said temperature to approximately 70° F. to produce a gelatinous film over said sausage, forming a mixture water-insoluble ethyl cellulose and 87% ethyl acetate, immersing said sausage having a gelatinous film in said mixture, withdrawing said sausage, and evaporating substantially all of said ethyl acetate by storing said sausage at a temperature in the order of 70° F. to provide a coating for said sausage which is substantially resistant to salt rust.

4. The product made by the process set forth in claim 3.

5. In a method for preparing a sausage product, wherein the sausage is first covered with a primary layer comprising a set, gelatinous film of a substance selected from the group consisting of gelatin, pectin, and algin, the step of superimposing on said primary layer, a layer comprising a water-insoluble cellulose material and a non-toxic, low boiling organic solvent.

6. The method of claim 5 in which said cellulose material is a water-insoluble cellulose ether.

7. The method of claim 5 in which said solvent is selected from the group consisting of ethyl alcohol, acetone, ethyl acetate and ether.

8. The product made by the process set forth in claim 5.

References Cited in the file of this patent

UNITED STATES PATENTS

| | | |
|---|---|---|
| 1,009,650 | Delius et al. | Nov. 21, 1911 |
| 1,072,406 | Gorin | Sept. 2, 1913 |
| 2,262,238 | Kellermann | Nov. 11, 1941 |
| 2,329,741 | Broderick | Sept. 21, 1943 |
| 2,337,645 | Cadwell | Dec. 28, 1943 |
| 2,427,857 | Hamill | Sept. 23, 1947 |
| 2,558,042 | Cornwell | June 26, 1951 |